United States Patent
Lee

(12) United States Patent    (10) Patent No.: US 7,470,054 B2
Lee    (45) Date of Patent: Dec. 30, 2008

(54) LIGHT-GUIDE BOARD

(75) Inventor: Cheng Sheng Lee, Lujhou (TW)

(73) Assignee: Kun Dian Photoelectric Enterprise Co. (TW)

( * ) Notice: Subject to any disclaimer, the term of this patent is extended or adjusted under 35 U.S.C. 154(b) by 87 days.

(21) Appl. No.: 11/648,607

(22) Filed: Jan. 3, 2007

(65) Prior Publication Data

US 2008/0158911 A1    Jul. 3, 2008

(51) Int. Cl.
    *F21V 8/00* (2006.01)
    *F21V 7/00* (2006.01)
(52) U.S. Cl. .......................... 362/625; 362/619; 349/66
(58) Field of Classification Search .................. 362/608, 362/619, 621, 623, 627, 327, 625; 349/66
See application file for complete search history.

(56) References Cited

U.S. PATENT DOCUMENTS

| | | | | |
|---|---|---|---|---|
| 5,703,667 A | * | 12/1997 | Ochiai | 349/65 |
| 5,971,559 A | * | 10/1999 | Ishikawa et al. | 362/625 |
| 6,808,281 B2 | * | 10/2004 | Ho | 362/600 |
| 6,979,112 B2 | * | 12/2005 | Yu et al. | 362/600 |
| 2004/0114347 A1 | * | 6/2004 | Leu et al. | 362/31 |

* cited by examiner

*Primary Examiner*—Stephen F Husar
*Assistant Examiner*—Peggy A. Neils
(74) *Attorney, Agent, or Firm*—Guice Patents PLLC

(57) ABSTRACT

A light-guide board includes a light guide plate made out of an optically transmissive material and having a transparent layer and a back reflecting layer formed integral with the back side of the transparent layer, and a plurality of reflecting baffles respectively extending from the back reflecting layer and embedded in the transparent layer for reflecting light to enhance the intensity of light and the uniformity in light intensity.

5 Claims, 9 Drawing Sheets

LIGHT-GUIDE BOARD

BACKGROUND OF THE INVENTION

1. Field of the Invention

The present invention relates to light-guide boards and more particularly, to an improved structure of light-guide board, which comprises a transparent light guide plate made out of an optically transmissive material, and a reflecting layer covered on and formed integral with the back side of the transparent light guide plate to reflect light passing through the transparent light guide plate so as to further enhance the intensity of light and the uniformity in light intensity.

2. Description of the Related Art

Since the invention of electric lamp by Thomas Edison, artificial lighting can be provided at night, and proper lighting can enhance task performance. Nowadays, different lighting fixtures in different shapes for different purposes are commercially available.

Regular lamps commonly use a lamp bulb or lamp tube to produce light. These lamps consume much electric energy and produce heat during operation, hence increasing the ambient temperature. Further, regular incandescent lamps twinkle when giving off light. Twinkling light is harmful to the eyes.

Further, new generation lamps that use LEDs (Light Emitting Diodes) to substitute for conventional incandescent bulbs for the advantages of low power consumption and long working life. Further, an LED is less harmful to the environment because it contains no mercury. However, a LED has the drawback of directional lighting.

In order to avoid directional lighting, multiple LEDs may be arranged together and set in different directions to constitute a lamp. However, using multiple LEDs to constitute a lamp greatly increases the cost. There is another way to constitute a light source by using a backlight module. A backlight module comprises a light-transmissive plate and a reflecting film on the back side of the light-transmissive plate. The reflecting film reflects light from side-mounting LEDs toward the front side of the light-transmissive plate. However, because the reflecting film is covered on the back side of the light-transmissive plate after the light-transmissive plate is made but not formed integral with the light-transmissive plate during fabrication of the light-transmissive plate, a gap exists between the light-transmissive plate and the reflecting film. When light goes through the light-transmissive plate from one lateral side, it touches the reflecting film and is then reflected by the reflecting film toward the front side of the light-transmissive plate. When light goes through the gap in between the light-transmissive plate and the reflecting film, the gap retains a part of light energy, thereby resulting in a loss of light energy occurs.

Therefore, it is desirable to provide a light guide board that eliminates the aforesaid problems.

SUMMARY OF THE INVENTION

The present invention has been accomplished under the circumstances in view. It is the main object of the present invention to provide a light-guide board, which is practical for use with high brightness LEDs (Light Emitting Diodes) to constitute a lamp that provides sufficient brightness and stable illumination with power saving and low heat features.

To achieve this and other objects of the present invention, the light-guide board comprises a light guide plate, which is made out of an optically transmissive material and has a transparent layer and a back reflecting layer formed integral with the back side of the transparent layer, and a plurality of reflecting baffles respectively extending from the back reflecting layer and embedded in the transparent layer for reflecting light to enhance the intensity of light and the uniformity in light intensity.

DETAILED DESCRIPTION OF THE PREFERRED EMBODIMENT

Figure 1:
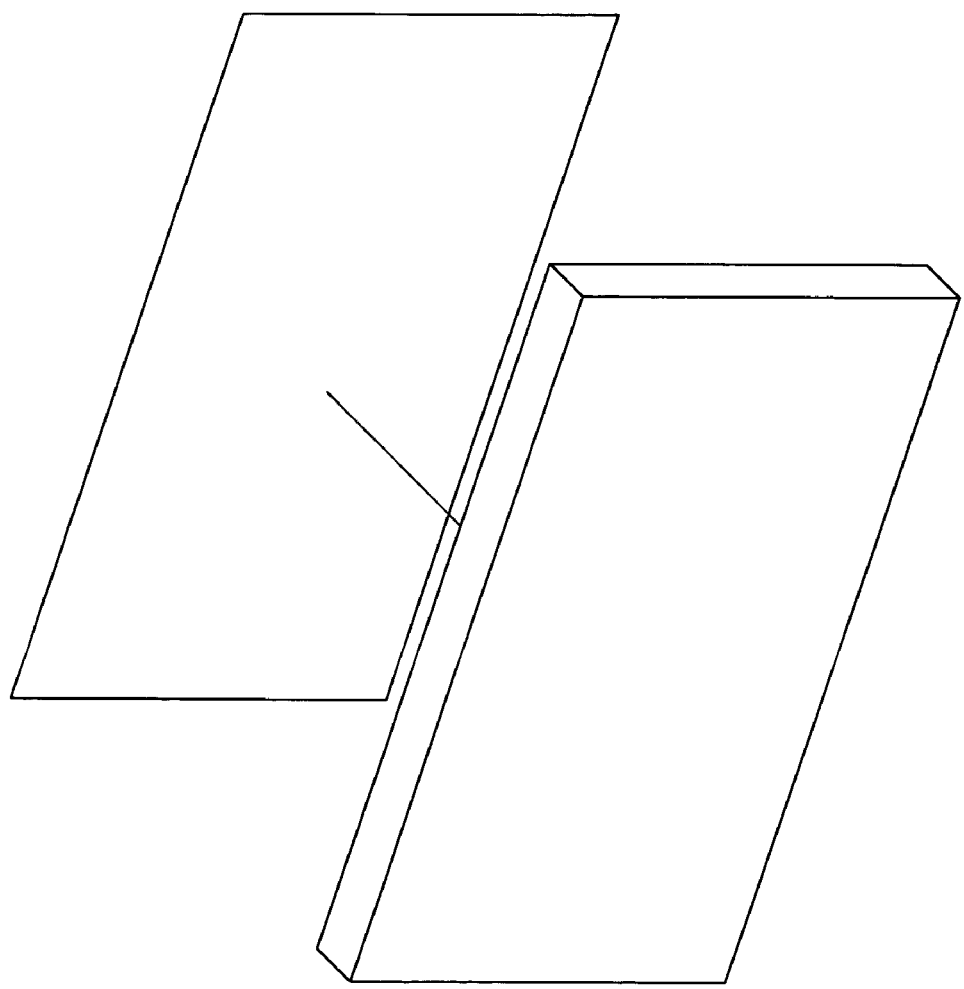
FIG. 1 is an exploded view of a light-guide board in accordance with the prior art.
Figure 2:
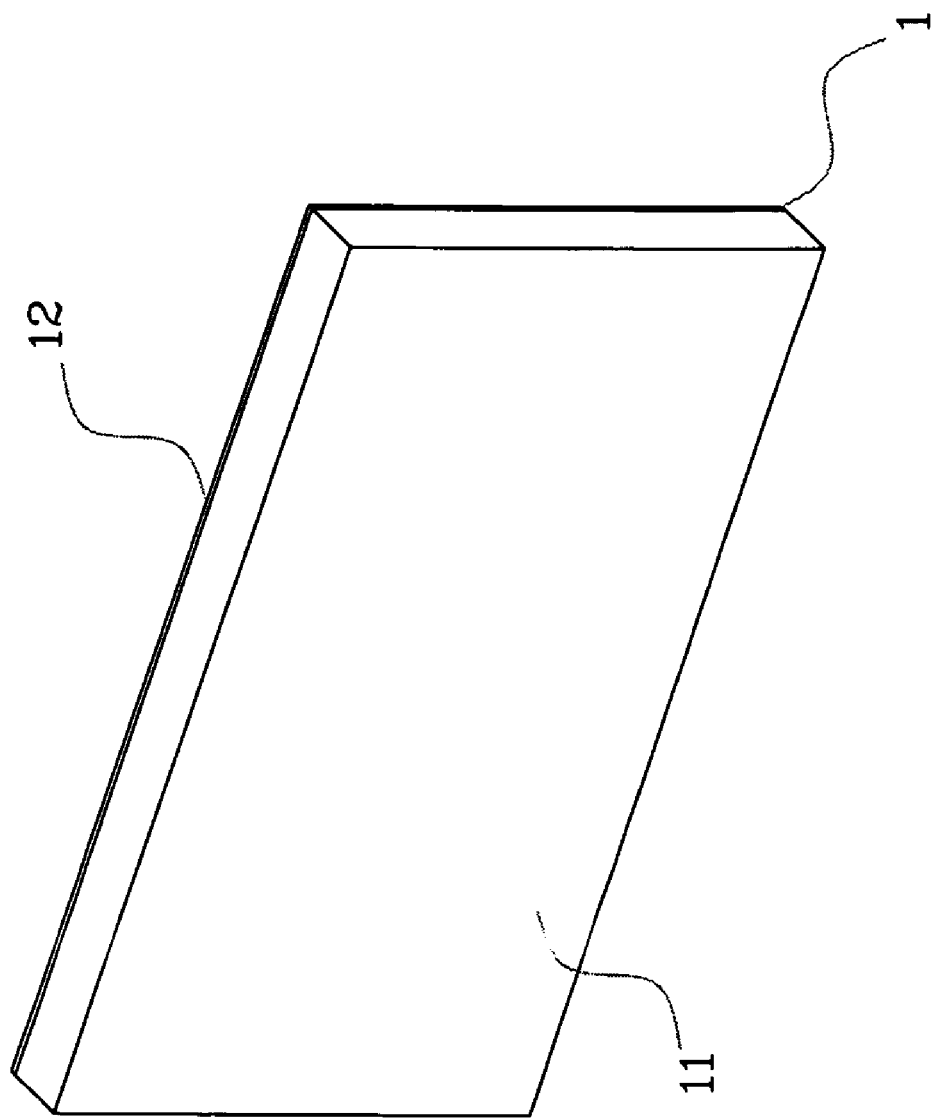
FIG. 2 is an elevational view of a light-guide board in accordance with a first embodiment of the present invention.

Referring to FIG. 2, a light-guide board in accordance with a first embodiment of the present invention is shown comprising a light guide plate 1 made out of an optically transmissive material. The light guide plate 1 has a transparent layer 11 and a back reflecting layer 12 covered on and formed integral with the back side of the transparent layer 11.

Figure 3:
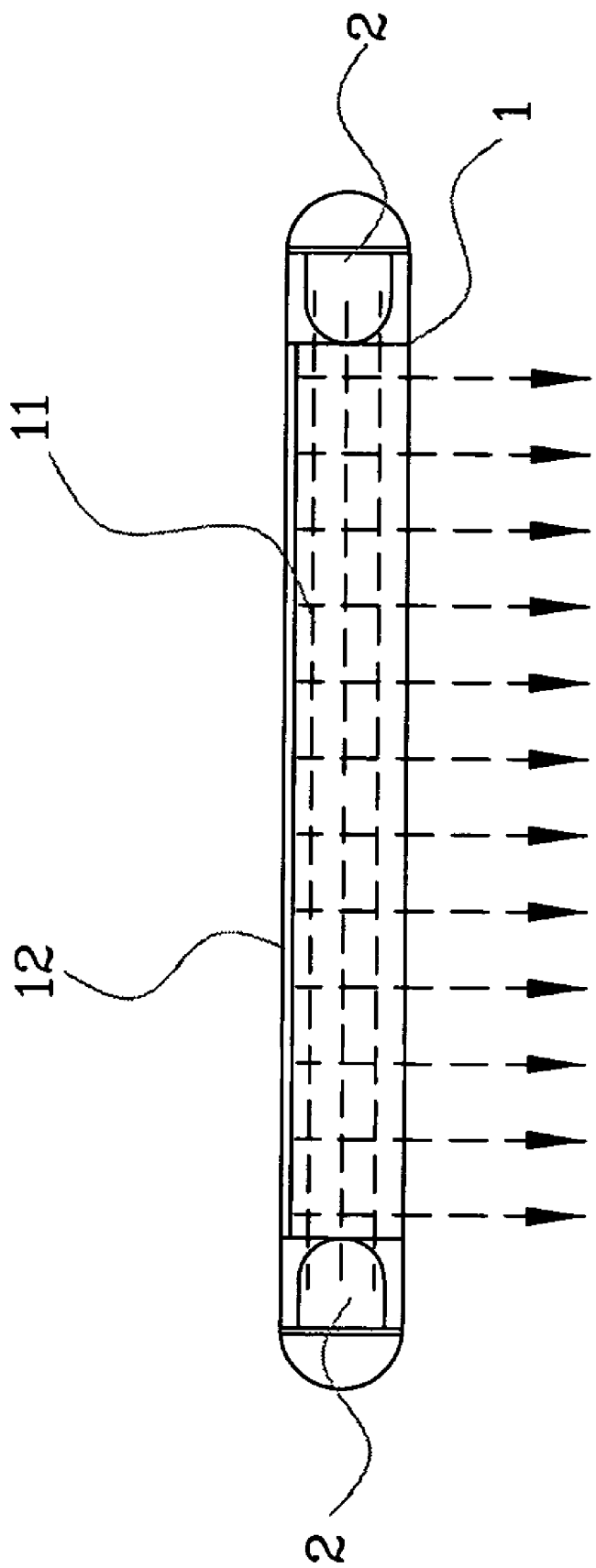
FIG. 3 is a schematic drawing showing an application example of the first embodiment of the present invention.

Referring to FIG. 3, the light guide plate 1 of the aforesaid first embodiment of the present invention can be used with light sources 2 to constitute an ultra-thin lamp. When the light sources 2 are turned on to emit light from the two distal ends of the ultra-thin lamp, light rays do not penetrate through the light guide plate 1, and the reflecting layer 12 directly reflect light rays through the transparent layer 11, thereby avoiding loss of light energy and enhancing the intensity of light.

Figure 4:
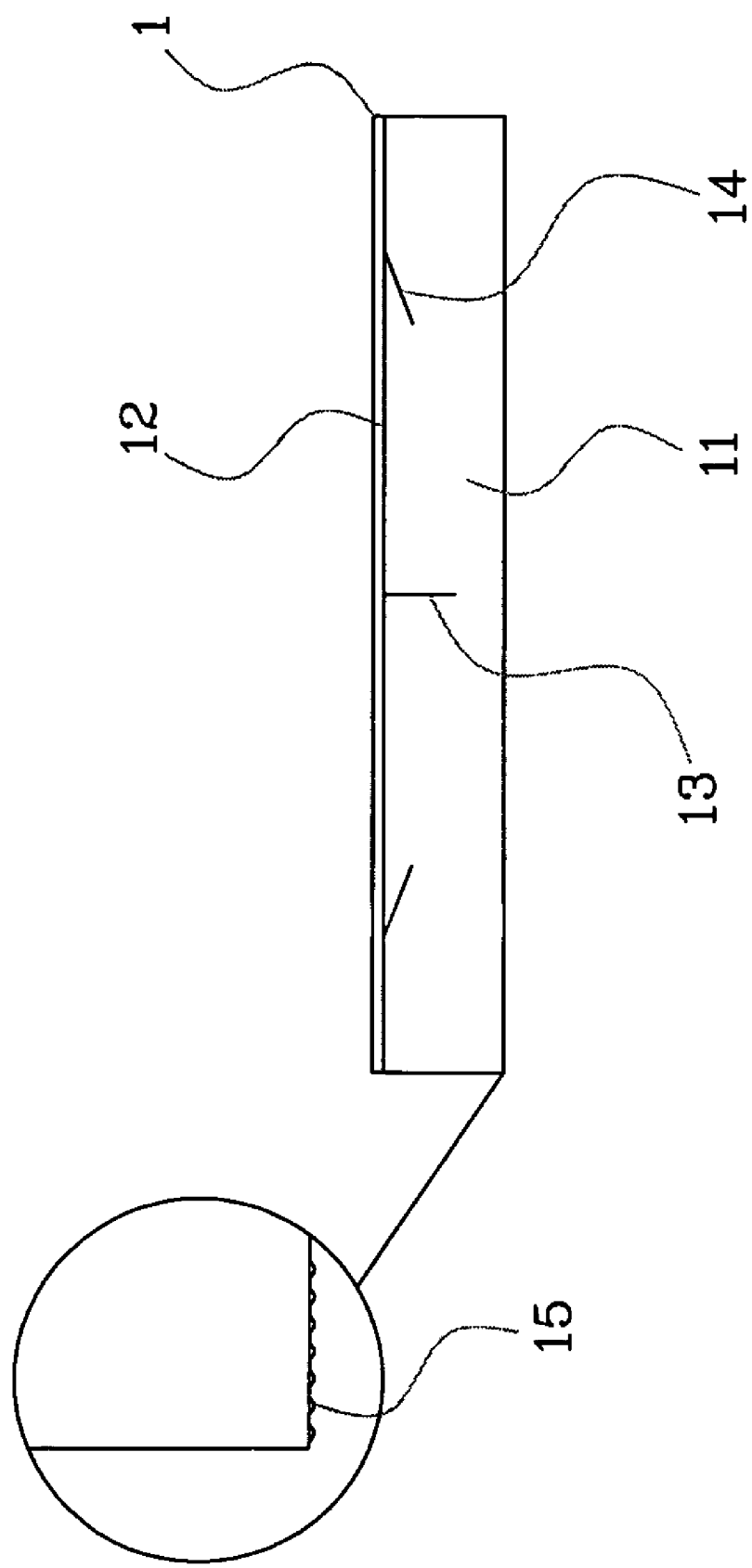
FIG. 4 is a top plain view of a light-guide board in accordance with a second embodiment of the present invention.
Figure 5:
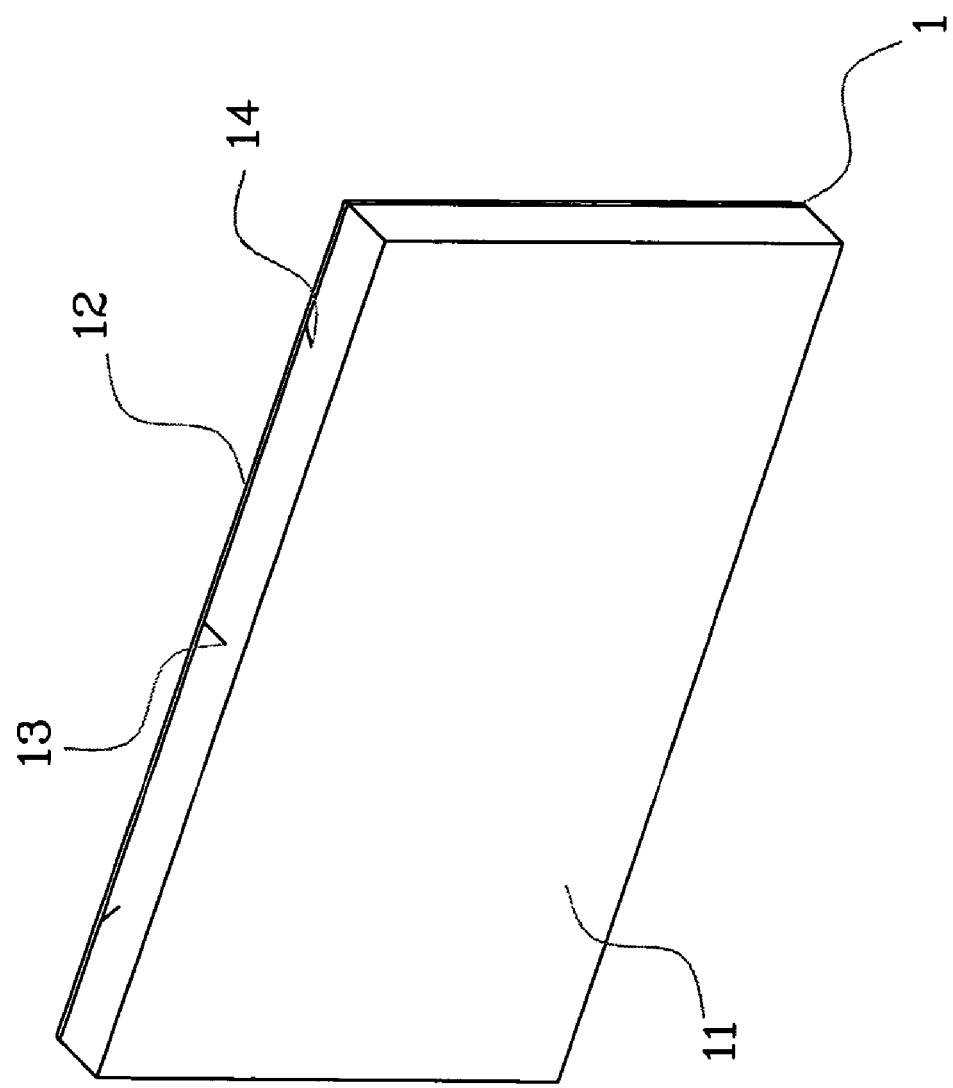
FIG. 5 is an oblique front elevational view of the light-guide board in accordance with a second embodiment of the present invention.

FIGS. 4 and 5 show a light-guide board in accordance with a second embodiment of the present invention. This embodiment is substantially similar to the aforesaid first embodiment with the exception that the light-guide board further comprises a dot net 15 formed on the front surface of the transparent layer 11 opposite to the back reflecting layer 12, and a plurality of reflecting baffles, for example, a first reflecting baffle 13 and two second reflecting baffles 14 respectively embedded in the transparent layer 11. The first reflecting baffle 13 is relatively longer and perpendicularly extending from the back reflecting layer 12 to the inside of the transparent layer 11 on the middle, having a height not greater than ¾ of the thickness of the transparent layer 11. The second reflecting baffles 14 are relatively shorter and obliquely extending from the back reflecting layer 12 to the inside of the transparent layer 11 at two sides relative to the reflecting baffle 13. Further, the second reflecting baffles 14 slope in one direction toward the middle part of the transparent layer 11.

Figure 6:
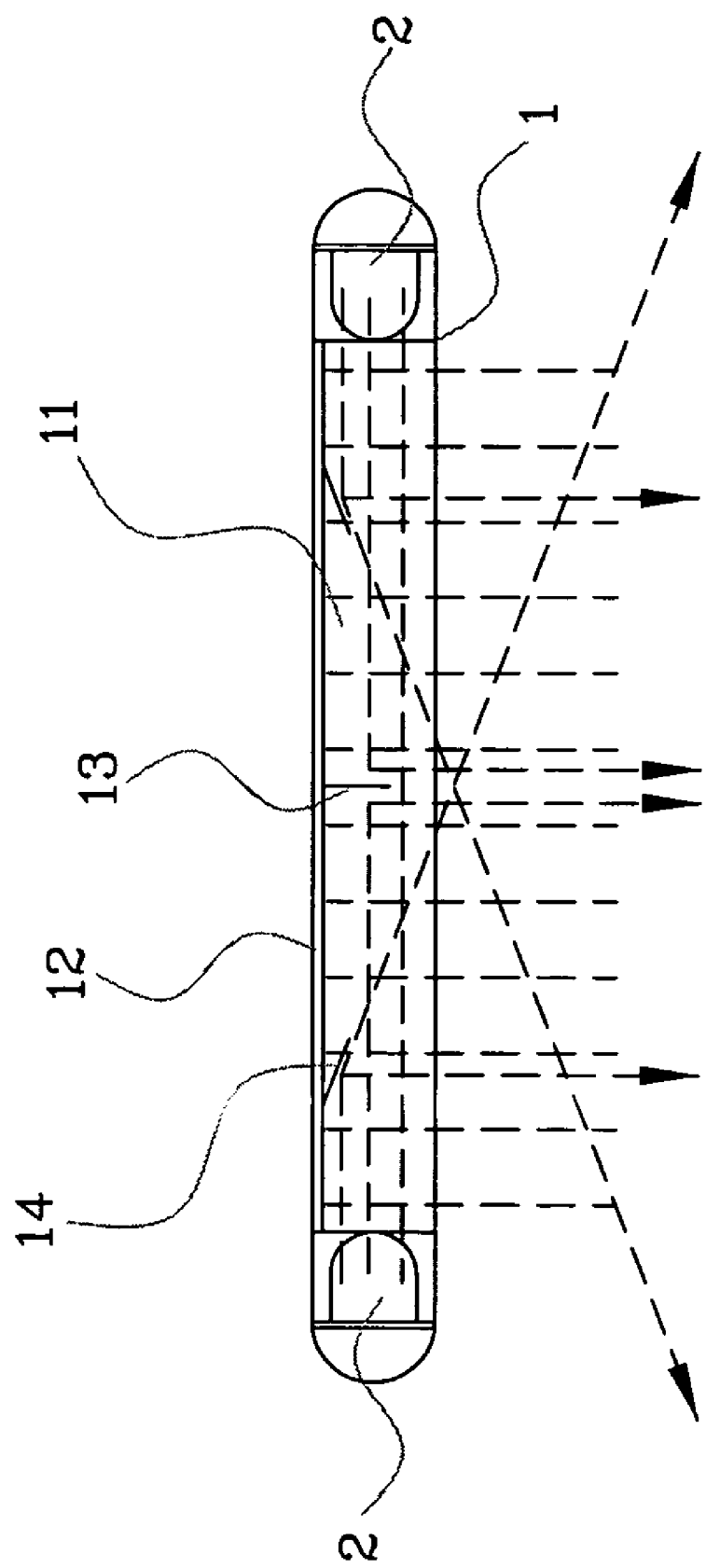
FIG. 6 is a schematic drawing showing an application example of the second embodiment of the present invention.

Referring to FIG. 6, the light guide plate 1 of the aforesaid second embodiment of the present invention can be used with light sources 2 to constitute an ultra-thin lamp. When the light sources 2 are turned on to emit light from the two distal ends of the ultra-thin lamp, light rays do not penetrate through the light guide plate 1, and the reflecting layer 12 directly reflect light rays through the transparent layer 11, and at the same time the reflecting baffles 13 and 14 reflect reflected light rays from the reflecting layer 12, thereby enhancing the intensity of light and the uniformity in light intensity.

Figure 7:
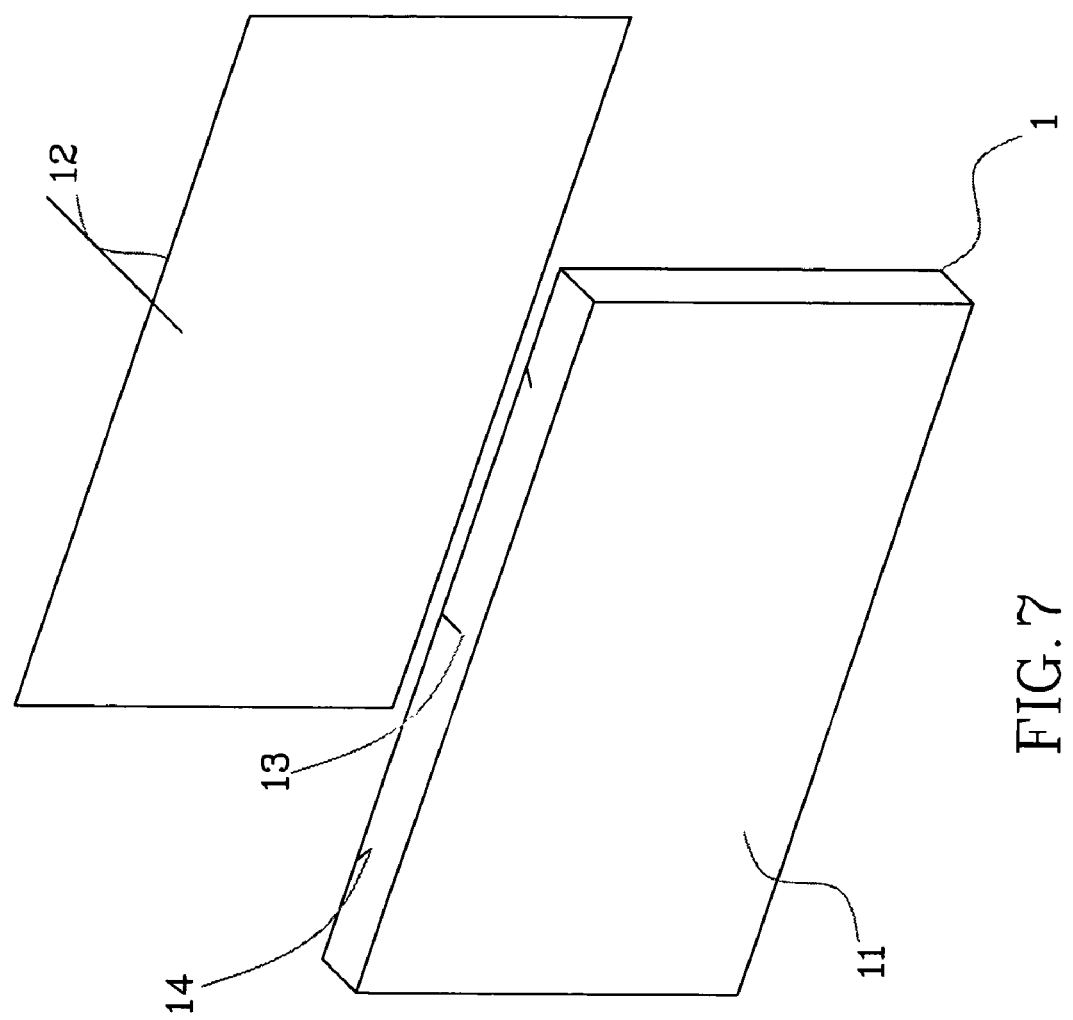
FIG. 7 is an exploded view of a light-guide board in accordance with a third embodiment of the present invention.

Referring to FIG. 7, the light guide plate 1 in accordance with a third embodiment of the present invention is made having a transparent layer 11 and reflecting baffles 13 and 14 embedded in the transparent layer 11, and a reflecting layer 12 is coated on the back side of the light guide plate 1 after fabrication of the light guide plate 1.

Figure 8:
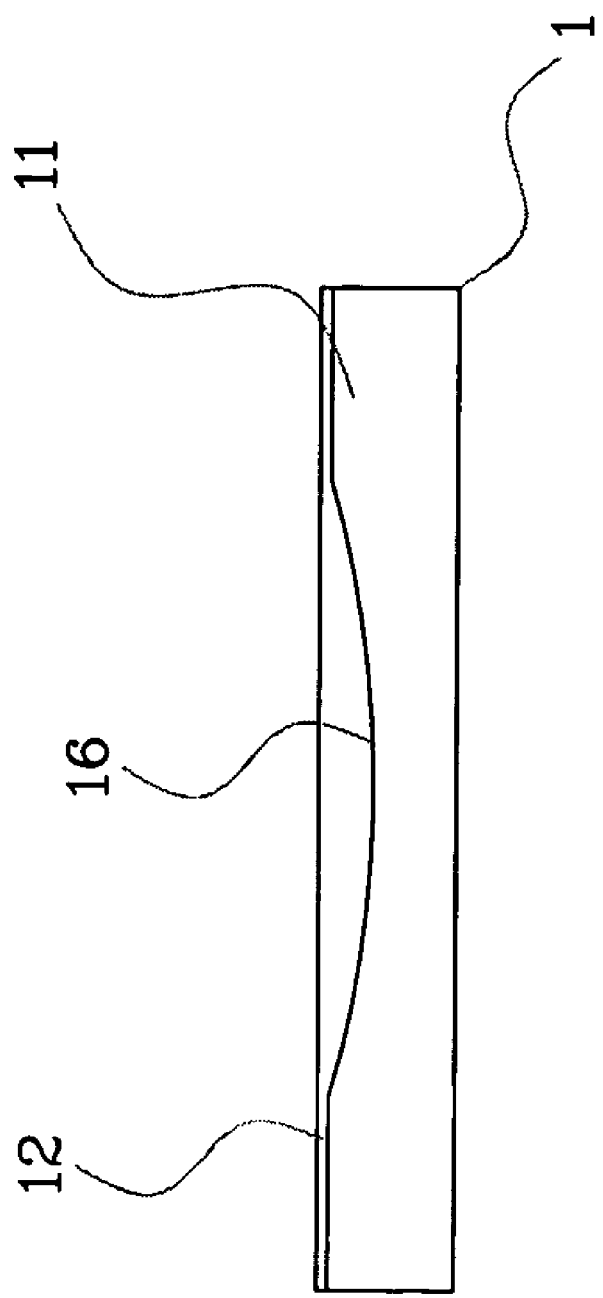
FIG. 8 is a plain view of a light-guide board in accordance with a fourth embodiment of the present invention.

FIG. 8 is a plain view of a light-guide board in accordance with a fourth embodiment of the present invention. According to this embodiment, the reflecting layer 12 of the light guide plate 1 has a smoothly arched convex portion 16 on the middle for reflecting light at different angles to enhance the lighting effect and also to increase the angle of illumination.

Figure 9:
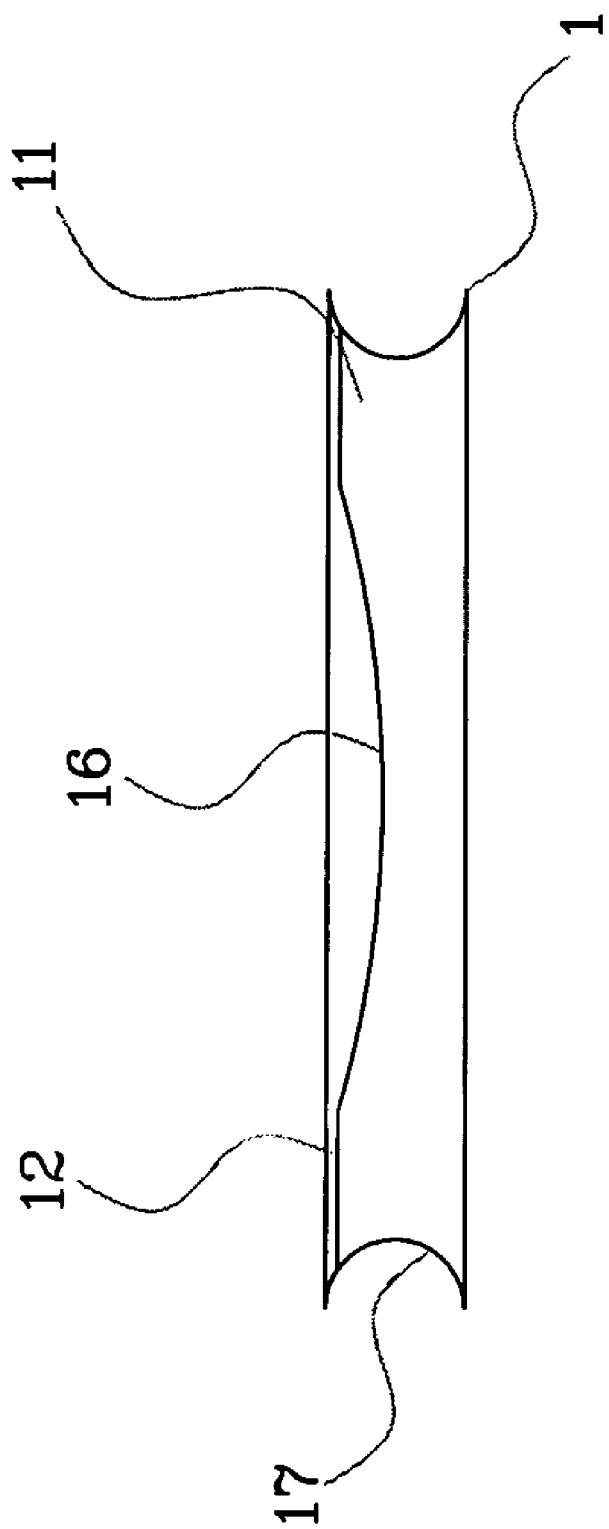
FIG. 9 is a plain view of a light-guide board in accordance with a fifth embodiment of the present invention.

FIG. 9 is a plain view of a light-guide board in accordance with a fifth embodiment of the present invention. According to this embodiment, the light guide plate 1 has two grooves 17 respectively formed on the opposite lateral sides thereof for attaching to a respective light source closely to enhance the lighting effect.

A prototype of light-guide board has been constructed with the features of FIGS. 2~9. The light-guide board functions smoothly to provide all the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A light-guide board comprising:
    a light guide plate made out of an optically transmissive material, said light guide plate having a transparent layer;
    a back reflecting layer formed integral with a back side of said transparent layer for reflecting light passing from light source means through said transparent layer; and
    a plurality of reflecting baffles respectively extending from said back reflecting layer and embedded in said transparent layer,
    wherein said reflecting baffles include a relatively longer first reflecting baffle perpendicularly embedded in a middle part of said transparent layer, said relatively longer first reflecting baffle having a height not greater than ¾ of the thickness of said transparent layer, and two relatively shorter second reflecting baffles obliquely embedded in said transparent layer at two opposite sides relative to said relatively longer first reflecting baffle and obliquely extending in direction toward each other.

2. A light-guide board comprising:
    a light guide plate made out of an optically transmissive material, said light guide plate having a transparent layer and a plurality of reflecting baffles respectively embedded in said transparent layer; and
    a back reflecting layer covered on a back side of said transparent layer for reflecting light passing from light source means through said transparent layer,
    wherein said reflecting baffles include a relatively longer first reflecting baffle perpendicularly embedded in a middle part of said transparent layer, said relatively longer first reflecting baffle having a height not greater than ¾ of the thickness of said transparent layer, and two relatively shorter second reflecting baffles obliquely embedded in said transparent layer at two opposite sides relative to said relatively longer first reflecting baffle and obliquely extending in direction toward each other.

3. The light-guide board as claimed in claim 1 or 2, wherein said light guide plate has a dot net protruded from a front surface of said transparent layer.

4. The light-guide board as claimed in claim 1 or 2, wherein said light guide plate has a groove on each of two opposite lateral sides thereof.

5. The light-guide board as claimed in claim 1, wherein said reflecting layer of said light guide plate has a smoothly arched convex portion protruded from a front side of a middle part thereof.

* * * * *